United States Patent [19]
Cheng

[11] Patent Number: 5,894,549
[45] Date of Patent: Apr. 13, 1999

[54] SYSTEM AND METHOD FOR FAULT DETECTION IN MICROCONTROLLER PROGRAM MEMORY

[75] Inventor: Chuck Cheuk-wing Cheng, Saratoga, Calif.

[73] Assignee: Scenix Semiconductor, Inc., Santa Clara, Calif.

[21] Appl. No.: 08/989,935

[22] Filed: Dec. 12, 1997

[51] Int. Cl.[6] .............................. G11C 7/00; G11C 13/00
[52] U.S. Cl. .................. 395/183.18; 395/380; 395/569; 395/800.23; 711/137; 711/218
[58] Field of Search ................ 395/183.18, 183.2, 395/183.16, 381, 395, 383, 583, 598, 569, 580, 800.41, 800.23; 711/137, 218

[56] References Cited

U.S. PATENT DOCUMENTS

| | | | |
|---|---|---|---|
| 4,183,462 | 1/1980 | Hideshima et al. | 395/185.03 |
| 4,821,235 | 4/1989 | Heald | 365/177 |
| 4,873,705 | 10/1989 | Johnson | 371/21.2 |
| 5,122,986 | 6/1992 | Lim | 365/189.11 |
| 5,357,472 | 10/1994 | Shirota | 365/201 |
| 5,446,697 | 8/1995 | Yoo et al. | 365/226 |
| 5,468,976 | 11/1995 | Evseev et al. | 257/177 |
| 5,491,360 | 2/1996 | Lin | 257/672 |
| 5,566,320 | 10/1996 | Hubert | 711/147 |
| 5,610,869 | 3/1997 | Yoo et al. | 365/222 |
| 5,636,171 | 6/1997 | Yoo et al. | 365/222 |
| 5,734,857 | 3/1998 | Gaubatz | 711/2 |

*Primary Examiner*—Ly Hua
*Attorney, Agent, or Firm*—Fenwick & West LLP

[57] ABSTRACT

A method for fault detection in microcontroller program memory includes a new move instruction. An address of program instruction data is placed in a word register and a mode register. The new address points to a new instruction in a program memory. The program instruction data is read from the program memory into an instruction register and then transferred from the instruction register to the word register and the mode register. The contents of the word register and the mode register are then written to a data memory. With the program instruction data now available in the data memory, the new instruction can be tested for data integrity and validity using, for example, fault detection mechanisms or processes. A system for fault detection to check instructions or data in the program memory for data integrity and validity in a program memory also is disclosed.

6 Claims, 5 Drawing Sheets

SYSTEM AND METHOD FOR FAULT DETECTION IN MICROCONTROLLER PROGRAM MEMORY

BACKGROUND OF THE INVENTION

1. Field of the Invention

The present invention relates to microcontrollers, and more particularly, to fault detection in program memory of microcontrollers.

2. Description of the Related Art

Microcontrollers are used in a wide variety of electronic products, for example, microwave ovens, dishwashers, automobile antilock brake systems, facsimile machines, etc. In order to function properly, every such electronic device or system must execute its program instruction code precisely. If there are errors associated with the storage and subsequent execution of the program instructions, there may be a system or device failure or even damage to the system or device itself.

To help prevent errors associated with the storage and execution of program instructions, Underwriter's Laboratories of Northbrook, Ill. developed a new safety standard that requires a microcontroller to be able to detect any faults related to its own program memory. Program memory is memory that stores program instruction code, while data memory is memory that stores data.

Detecting faults with a microcontroller's own program memory, however, is problematic when a data bus and an instruction bus are separated, for example, as with Harvard architecture microcontrollers. One problem is that prior art microcontrollers are not designed for performing some form of self checking the program memory data. Rather, the program instruction data in program memory is merely available for execution and not for reading to a data register or data memory. Thus, because the central processing unit does not store program instruction data in data memory, the program instruction data cannot be accessed by programs or systems that can perform data checks on the integrity or validity of the program instruction data.

One attempt to detect faults in program memory included using an instruction, "LAID," as for example, in an 8-bit complex instruction set computing ("CISC") architecture microcontroller by National Semiconductor of Santa Clara, Calif. The LAID instruction uses a contents of an accumulator to point to a fixed data table stored in a program memory. The contents of the accumulator are exchanged with a contents of a lower 8-bits of a program counter. Data accessed from the program memory location addressed by the program counter is then transferred to the accumulator. Simultaneously, the original contents of the lower 8-bits of the program counter are transferred back to the lower 8-bits of the program counter from the accumulator.

It is noted that the upper 7-bits of the program counter are unaffected and unchanged during execution of the LAID instruction. Thus, the accumulator and associated fixed data table must both be located in the current program memory of 256 bytes. Therefore, the LAID instruction is very restrictive because it does not allow for freely reading any location in the program memory without extensive set-up, making the LAID instruction unsuitable for fault checking in program memory.

Another attempt to detect faults in program memory is to have the microcontroller add two extra parity bits to each instruction inside the code memory, as for example, in a reduced instruction set computer ("RISC") architecture microcontroller. At each instruction fetch, the prior art microcontroller performs a parity check on every fetched instruction and the two parity bits. When a parity check fails, the program code is halted and an error message is transmitted. A problem with using the extra two parity bits is that there are extra system resources required for checking each instruction inside the program memory, thereby increasing the cost of the microcontroller. Further, because the parity bits for each instruction must be checked, the processing time for executing instructions is also increased and results in an overall decrease in microcontroller performance.

Using two extra parity bits to detect faults in program memory also decreases overall microcontroller flexibility. A RISC microcontroller uses instructions of the same bit length. Every different kind of instruction, e.g., arithmetic logic unit operations, branches, load instructions, store instructions, must fit into the same bit length. Thus, for a microcontroller having, for example, a 12-bit instruction word, the number of data addressing modes is limited. Because of a limited number of data addressing modes available in a RISC architecture microcontroller, such microcontrollers are ill-suited to have instructions that can read randomly any location in program memory and store the result into the data memory for subsequent data checking.

Therefore, there is a need for a system and a method for detecting faults in a program memory of a microcontroller that provides the flexibility to test the integrity of the program memory immediately after reset or during runtime of main program.

SUMMARY OF THE INVENTION

A microcontroller of the present invention includes a system and a method having an instruction, "move instruction word" (MOVIW), for reading a contents of a program memory into a data memory. A program memory is a memory for storing program instructions and a data memory, e.g., a user addressable data register or a dynamic or static random access memory, is a memory for temporary storage of data.

A data checking or fault detection system of the present invention includes a microcontroller having a program memory, a data memory, and a central processing unit. The central processing unit includes a set of special registers. The special registers include a word register (W), a mode register (MBIT), and a program counter register (PC). The central processing unit also includes an instruction register (IR) and at least one temporary register (TMP).

The program memory is where the MOVIW instruction is stored. The program memory is coupled with the program counter register and the instruction register. The program counter register is coupled to the word register and the mode register. The program counter register is also coupled to the temporary register.

The central processing unit also includes a series of pipeline stages for fetching and executing stored instructions. Conceptually, the pipeline stages include an instruction fetch stage, an operand fetch stage, an execution stage, and a write back stage. The instruction fetch stage is coupled to the operand fetch stage. The operand fetch stage is coupled to the execution stage. The execution stage is coupled to the write-back stage. Briefly, the instruction fetch stage reads an instruction from the program memory. The operand fetch stage decodes the instruction, determines what operation to perform, and determines memory operands to fetch for the instruction. The execution stage performs the actual operation specified by the instruction using the memory operands. The write-back stage writes the results of the operation to the data memory.

The MOVIW instruction is a 4-cycle instruction, that is, the MOVIW instruction uses four clock cycles to fetch and execute program instruction data. The MOVIW instruction is available for a data-checking system and/or process to summon from the program memory, e.g., when directed by the data checking system and/or program or when the microcontroller is reset.

When the data checking system and/or process initiates, the MOVIW instruction is fetched and at a cycle zero the MOVIW instruction is at the operand fetch stage of the central processing unit where it prepares to execute. An address of a program instruction data, that is to be read from the program memory, is stored in two separate registers the word register and the mode register. A first 8 bits of the address is stored in the word register, which is also 8 bits long. A second 3 bits of the address is stored in the mode register, which is 4 bits long.

At a first cycle the execution stage of the central processing unit executes the MOVIW instruction. The microcontroller loads the address of the program instruction data into the program counter register. Simultaneously, any existing contents of the program counter register are moved to a temporary register. It is noted that the program counter may have contained an address of an instruction that would execute after the MOVIW instruction executes.

At a second cycle, the program instruction data is addressed by the new contents of the program counter register. The contents of the program counter register operate as a pointer into the program memory. The program instruction data addressed by the contents of the program counter register is read into the instruction register. Simultaneously, the contents of the temporary register are read back into the program counter register. That is, the address of the prior program instruction data is read back into the program counter.

At a third cycle, the program instruction data in the instruction register is stored into the word and the mode registers. Simultaneously, the next instruction after the MOVIW instruction is fetched and the data contents of that instruction are read from the program memory to the instruction register. The next instruction's is fetched from program memory using contents of the program counter register to point to the address of that instruction in the program memory once the MOVIW instruction completes execution.

The program instruction data in the word and the mode registers is now in the data memory. The program instruction data from the program memory is, therefore, available for data checking systems and/or processes for testing the data integrity and validity.

At the fourth cycle, the instruction after the MOVIW instruction is at operand fetch stage, where it gathers the necessary memory operands for the execution stage. Simultaneously, the MOVIW instruction completes execution. In a fifth cycle, the instruction after the MOVIW instruction executes.

The claimed invention, by using the MOVIW instruction, advantageously allows a small program to execute a data checking routine, for example, a Cyclic Redundancy Code (CRC) check, to evaluate the contents of the program memory immediately after reset of the microcontroller or when initiated by a data checking system and/or process. That is, the claimed invention beneficially moves program instruction data from the program memory to data memory so that the program instruction data may be evaluated using a system, program, and/or algorithms that check data integrity and validity. Therefore, a microcontroller can be compliant with Underwriter Laboratory specifications that require a program memory to self-detect faults associated with data within it.

The features and advantages described in this specification are not all-inclusive, and particularly, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

To detect and prevent errors with the storage and execution of program instruction code, the present invention allows for a microcontroller to detect faults and test data integrity and validity with respect to data in a program memory in the microcontroller.

Figure 1:
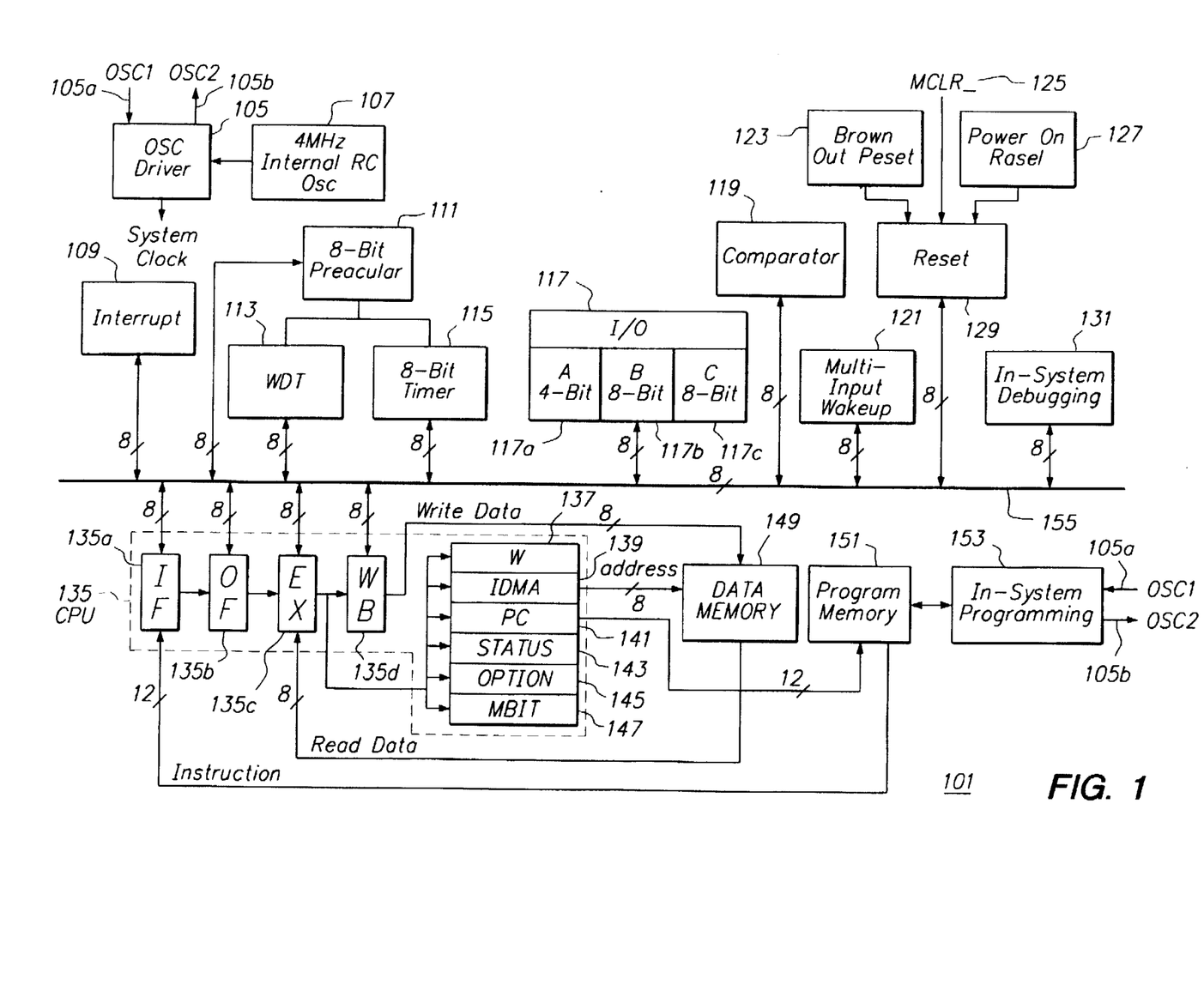
FIG. 1 is a block diagram of a microcontroller in accordance with the present invention.

FIG. 1 is a block diagram of a microcontroller 101 in accordance with the present invention. The microcontroller 101 may be used to control operation of any device or system, for example, a microwave oven, an alarm unit, or an antilock braking system that incorporates the microcontroller 101. The microcontroller 101 components include an oscillator driver 105, an internal oscillator 107, an interrupt block 109, a prescalar block 111, a watchdog timer 113, a interrupt timer block 115, an input/output block 117, a comparator 119, a multi-input wakeup block, a brownout reset block 123, an external pin line 125, a power on reset block 127, an in-system debugging block 131, a central processing unit ("CPU") 135, a data memory 149, a program memory 151, an in-system programming block 153, and a data bus 155.

In addition, the central processing unit 135 includes a set of special registers. The special registers include, for example, a word (W) register 137, a indirect data memory address register 139, a program counter (PC) register 141, a status register 143, an option register 145, and a mode (MBIT) register 147. These registers, e.g., 135–147, are accessible by programs external to the central processing unit 135, for example, a user interfaced program. The central processing unit 135 also includes an instruction register 211, a decoder register 215, and one or more temporary registers 411.

The internal oscillator 107 is coupled to the oscillator driver 105. The oscillator driver 105 also includes a first clock pin (OSC1) 105a and a second clock pin (OSC2) 105b. The prescalar block 111 is coupled to the watchdog timer 113 and the interrupt timer block 115. The brown out reset block 123, the external pin line 125, and the power on reset block 127 are coupled to the reset block 129. The interrupt block 109, the prescalar block 111, the watchdog timer block 113, the interrupt timer block 115, the input/output block 117, the comparator 119, the multi-input wakeup block 121, the reset block 129, and the in-system debugging block 131 are all coupled to the data line 155.

The central processing unit 135 is coupled to the data memory 149, the program memory 151, and the data bus 155. Particularly, the word register 137, the program counter register 141, and the mode register 147 are coupled to the data memory 149. The program counter register 141 is also coupled to the program memory 151. In addition, the program memory 151 is also coupled to the in-system programming block 153.

It is noted that in a preferred embodiment the input/output block 117 is a multiport input/output block that includes, for example, a first port, A, 117a, a second port, B, 117b, and a third port, C, 117c, where each port is coupled to the data bus 155. The first port 117a may be a 4-bit port while the second the third ports 117b, 117c may be 8-bit ports. Each pin of each port 117a, 117b, 117c can be set as an input or an output port. The central processing unit 135 can input data or output data to the ports 117a, 117b, 117c through the particular port's respective pin or pins.

The internal oscillator 107 may be a 4 MHz internal oscillator. The 4 MHz signal may be generated from an internal resistor and capacitor ("RC") circuit. Further, the interrupt timer block 115 may be an 8-bit interrupt timer block and the prescalar block 111 may also be an 8-bit prescalar block.

The central processing unit 135 includes four pipeline stages. The pipeline stages may be conceptually referenced as the instruction fetch stage 135a, the operand fetch stage 135b, the execution stage 135c, and the write back stage 135d. The instruction fetch stage 135a is coupled to the operand fetch stage 135b, the program memory 151, and the data bus 155. The operand fetch stage 135b is coupled to the execution stage 135c and the data bus 155. The execution stage is coupled to the write back stage 135d, each of the special registers 135-147, the data memory 149, and the data bus 155. The write back stage 135d is coupled to the data memory 149.

Turning now to the functionally of the microcontroller 101, the oscillator driver 105 is coupled to receive external oscillation signals, for example, along the pin OSC1 105a, to generate system clock or timing signals for the microcontroller 101 itself, as well as other components of a microchip that includes the microcontroller 101. The external oscillation signals may, for example, be derived from crystal oscillators, resonators, or resistors and capacitors depending on the oscillation mode chosen. Moreover, the oscillator driver 105 may distribute a clock signal generated by the internal oscillator 107.

The interrupt block 109 generates and handles interrupt signals for components of the microcontroller 101. The interrupt signals may be generated from, for example, a timeout of the interrupt timer block 115 or a clock signal edge transition on the second port 117b of the input/output block 117. An interrupt signal from the interrupt block 109 halts the normal execution of the particular component of the microcontroller 101 at the correct time and saves the return address into an interrupt stack. Simultaneously, the central processing unit 135 to jump to an interrupt service subroutine to service the request triggered through the interrupt signal.

The prescalar block 111, used by both the watchdog timer 113 and the interrupt timer block 115, divides down the clock signals, for example, from the oscillator driver 105, by a set number before passing the divided clock signals to the watchdog timer 113 and the interrupt timer block 115. The watchdog timer 113 monitors any irregular activities by generating a reset signal. Once the watchdog timer 113 is enabled, it should be cleared as soon as possible to prevent generating a reset signal to the entire microchip, including the microcontroller 101. The interrupt timer block 115 generates the clock or timing signals that are available to the microcontroller 101 for any general purpose. When enabled, the interrupt timer block 115 also enables the interrupt block 109 to generate an interrupt signal.

The comparator 119 compares the values of any two analog signals and generates a digital signal output indicating the result of that comparison. The multi-input wakeup block 121 samples signal transitions, i.e., a transition from a logic low ("0") to a logic high ("1") or a transition from a logic high to a logic low, on the pins of the ports 117a, 117b, 117c of the input/output block 117. If the interrupt block 109 is enabled and the microcontroller 101 is not in a SLEEP mode, the transition will cause an interrupt that halts the components of the microcontroller 101. If the microcontroller 101 is in the SLEEP mode, the transition will wake up the components of the microcontroller 101 to begin operating again.

The power-on reset block 127 generates a reset signal to the reset block 129 when the microchip initially powers on. In turn, the reset block 129 generates reset signal to the entire microcontroller 101. This reset mechanism initializes the registers of the microcontroller 101 and the central processing unit 135.

The brownout reset block 123 generates a reset signal for the reset block 129 when the microcontroller 101 power level dips below a preset or predetermined level. In turn, the reset block 129 generates a reset signal that resets all the components of the microcontroller 101. This reset mechanism prevents the microcontroller 101 from harming the device or system controlled by the microcontroller 101.

A reset signal may also be received from an external source by the microcontroller 101 through the external reset line 125. Upon receiving the reset signal from the external source, the reset block 129 may generate a reset signal to reset all the components of the microcontroller 101.

The in-system debugging block 131 interfaces with an external debugging system. Depending on the command received by the in-system debugging block 131 from external debugging system, the in-system debugging block 131 inserts breakpoints, reads and writes to internal registers, and performs a single-step where an interrupt is generated so that the microcontroller 101 can review what changes occurred to data memory after execution of the previous instruction. The in-system debugging block 131 allows for a simplified external debugging system because the in-system debugging block 131 performs most of the functions previously completed by conventional emulation systems on the microchip.

The in-system programming block 153 interfaces with external program. Using the first (OSC1) and the second (OSC2) clock pins 105a, 105b, the in-system programming block 153 allows the microcontroller 101 to communicate serially with external components. Depending on the commands the in-system programming block 153 receives from external programs, the in-system programming block 153 can erase, read, or program the program memory 151.

The program memory 151 may be, for example, an electrically erasable programmable read-only memory (EEPROM). In a preferred embodiment, the program memory 151 is a 2k×12 EEPROM, i.e., two kilowords of data with a 12-bit wide program instruction data word. To address the two kilowords of data in the program memory 151, only an 11-bit address is used to point to or address program instruction data in the program memory 151.

The program memory 151 detects the changes in the program counter register 141 address. The program counter register 141 is 12-bits wide (although only 11-bits are used to address a 2k×12 program memory) and contains an address of an instruction located within the program memory 151. If any bit of the program counter register 141 changes value, the program memory 151 will power up and output the instruction pointed to or addressed by the new program counter register 141 contents. If no bit of the program counter register 141 changes value, the program memory 151 is in a powered down state.

The data memory 149 may be, for example, a static random access memory (SRAM), a dynamic random access memory (DRAM), or a data register. The data memory 149 only samples a control signal, for example, read (RD) or write (WE), at the rising edge of the clock signal generated from the oscillator driver 105. When the data memory 149 senses that at least one of the read control signal or the write control signal is active, the data memory 149 will perform the appropriate write or read, or both, operations. The data memory 149 also stores temporary data and functions as a register file for the central processing unit 135.

In the central processing unit 135, each of the special registers 137–147 is user accessible. In addition, the word register 137 is used by many instructions for an operand. The word register 137 also stores, for example, data and data addresses and in one embodiment is used to transfer data from the program memory 151 to the data memory 149. In a preferred embodiment, the word register 137 is 8-bits wide.

The indirect data memory address register 139 stores an address pointer into the data memory 149. The program counter register 141 stores an address pointer to the next instruction to be fetched by the central processing unit 135. The status register 143 indicates the current status of the central processing unit 135. For example, the status register 143 may include a carry flag, a zero flag, a power-down bit, or a time-out bit.

The option register 145 is a control register that configures the microcontroller 101. The mode register 147 is used as a type of temporary register. The mode register 147 stores data and data addresses. In addition, in one embodiment the mode register 147 is used to transfer data from the program memory 151 to the data memory 149. In a preferred embodiment, the mode register 147 is 4-bits wide.

Further, as stated above, the central processing unit 135 includes a series of pipeline stages for fetching and executing stored instructions. The pipeline stages include the instruction fetch stage 135a, the operand fetch stage 135b, the execution stage 135c, and the write back stage 135d. The instruction fetch stage 135a reads an instruction from the program memory 151. The operand fetch stage 135b decodes the instruction, determines what operation to perform and determines particular memory operands of the instruction. The execution stage 135c performs the actual operation specified by the instruction using the memory operands. The write-back stage 135d writes the results of the actual operation to the data memory 149.

Figure 2:
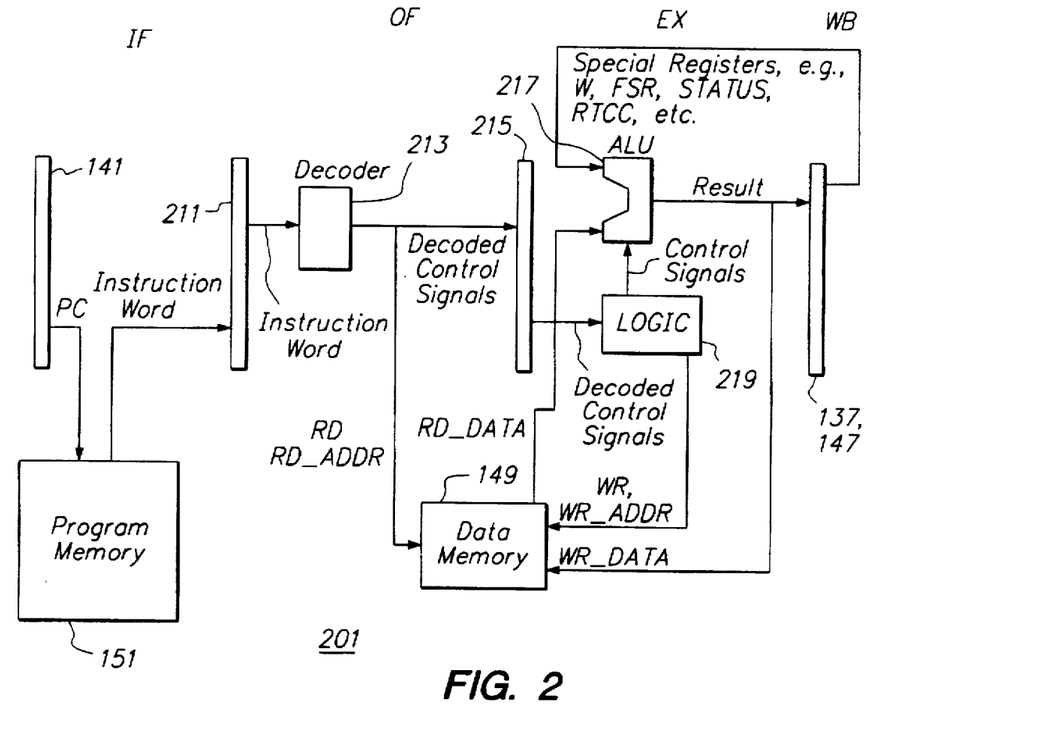
FIG. 2 is a block diagram illustrating a pipeline of a central processing unit in accordance with the present invention.

FIG. 2 is a block diagram illustrating a pipeline system 201 in conjunction with the central processing unit 135 in accordance with the present invention. The figure shows components of the central processing unit 135 illustrated in FIG. 1, specifically, the program counter register 141 and a special register, e.g., the word register 137, the indirect data memory address register 139, the status register 143, the mode register 147, or another register in the central processing unit 135. The central processing unit 135 is also shown to include the instruction register 211, a decoder 213, the decoder register 215, an arithmetic logic unit 217, and a control logic 219.

In the pipeline system, the program counter register 141 and the instruction register 211 of the central processing unit 135 are coupled to the program memory 151. The instruction register 211 is also coupled to the decoder 213. The decoder 213 is coupled to the decoder register 215. The decoder register 215 is coupled to the control logic 219. The control logic 219 is coupled to the arithmetic logic unit 217. The arithmetic logic unit is coupled with one of the special registers, e.g., 137, 139, 143. The decoder 213, the arithmetic logic unit 217 and the control logic 219 of the central processing unit 135 are coupled to the data memory 149.

When the pipeline system 201 is operational, on a rising edge of the system clock signal, at the instruction fetch stage 135a, program instruction data is fetched from the program memory 151. The fetched program instruction data is pointed to or addressed by the contents of the program counter register 141. In a preferred embodiment, the program instruction data is typically a 12-bit instruction word that is addressed by an 11-bit address field. The program memory 151 passes the program instruction data to the instruction register 211. On the next rising edge of the system clock signal, at the operand fetch stage 135, the instruction register 211 passes the program instruction data to the decoder 213.

At the operand fetch stage 135b, the program instruction data is preliminarily decoded to begin tasks such as reading data from data memory 149. In the operand fetch stage 135b, bits of the program instruction data word are interpreted to determine whether this instruction needs to, for example, write or read data from data memory 149, perform any arithmetic logic unit 217 operations, input or output any data through the input/output port 117, or to change any flags in the status register 143. It is noted that the operand fetch stage 135b also generates, if necessary, a read address and/or a read signal to set up a read operation to the data memory 149.

In the operand fetch stage 135b, the program instruction data word is decoded into one or more control signals and each control signal enables a specific task. Preliminarily decoding the program instruction data word reduces the time required to completely decode the instruction in execution stage 135c, so that the execution stage 135c has more time available to perform the actual instruction operation.

Once the program instruction data word is preliminarily decoded, it is passed to the execution stage 135c. The execution stage 135c is where logic operations are performed for executing the instruction. For example, the arithmetic logic unit 217 performs operations such as addition, subtraction, shift-left, shift-right or other logic operations. Also in the execution stage 135c, write operations to the central processing unit 135 registers, for example, the word register 139 or the indirect data memory address register 139, are performed. If necessary, in the execution stage 135c a write address is generated and a write execution signal is prepared for performing a write operation to the data memory 149. Write operations to the data memory 149 are performed in the write back stage 135d.

To prevent errors associated with the storage and execution of instructions in the program memory 151, a data checking or fault detection system and/or process is provided an instruction, move instruction word ("MOVIW"), for testing program instruction data that is in the program memory 151. The data checking system and/or process initiates the MOVIW instruction so that the program instruction data contents from program memory 151 are moved to data memory 149. The data checking system and/or process may then access the program instruction data through, for example, the in-system debugging block 131.

The MOVIW instruction is a four cycle instruction, i.e., it takes four clock cycles to execute the MOVIW instruction. The MOVIW instruction may be triggered by a data checking mechanism or process for execution at any predetermined time during operation of the microcontroller 101. For example, the MOVIW instruction may be triggered by a data checking mechanism or process when the microcontroller 101 is first powered up, after each reset, and/or every time particular program instruction data must be fetched from the program memory 151 and executed.

Figure 3:
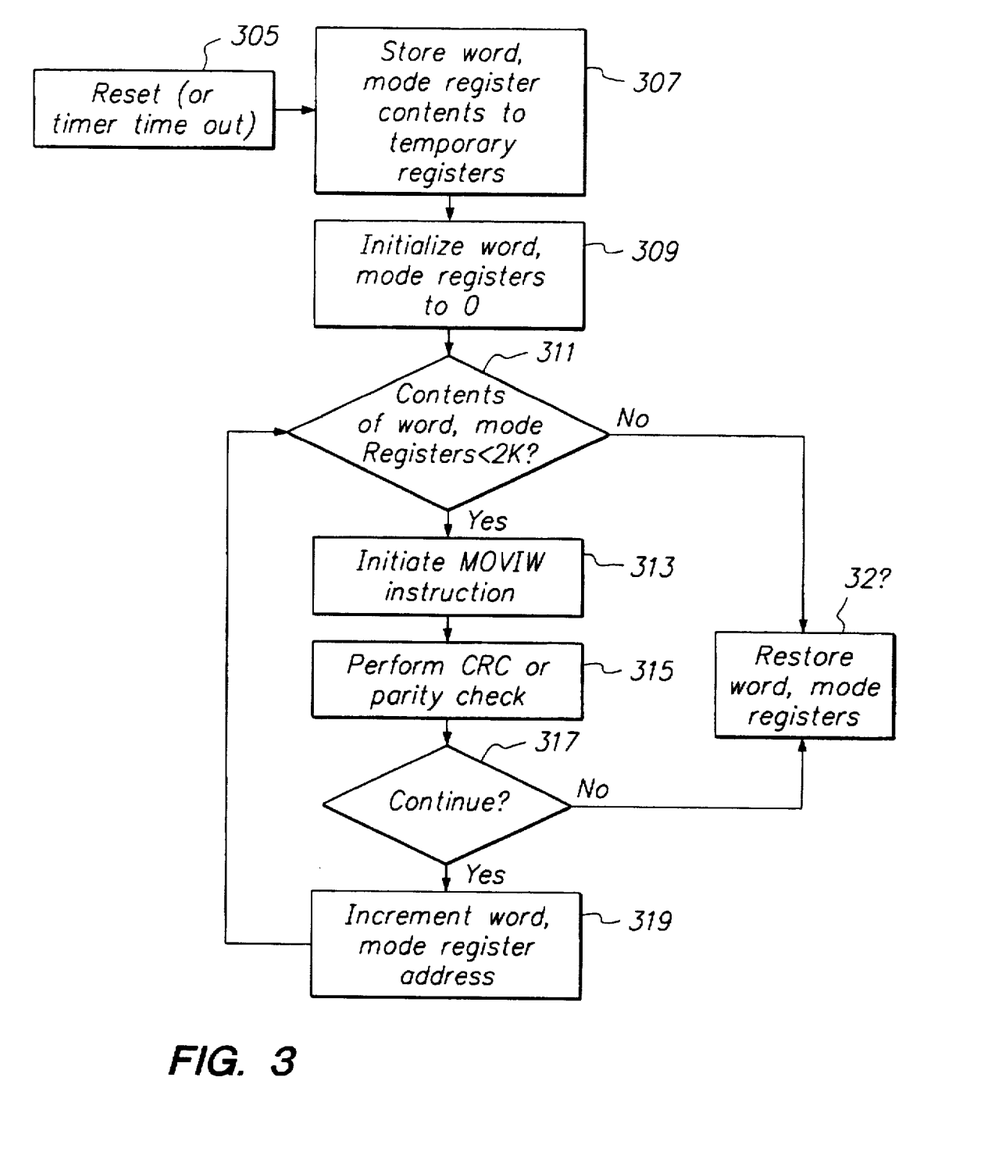
FIG. 3 is a flow diagram of a process for moving a contents of a program memory to a data memory for access by a data-checking process or mechanism.
Figure 4A:
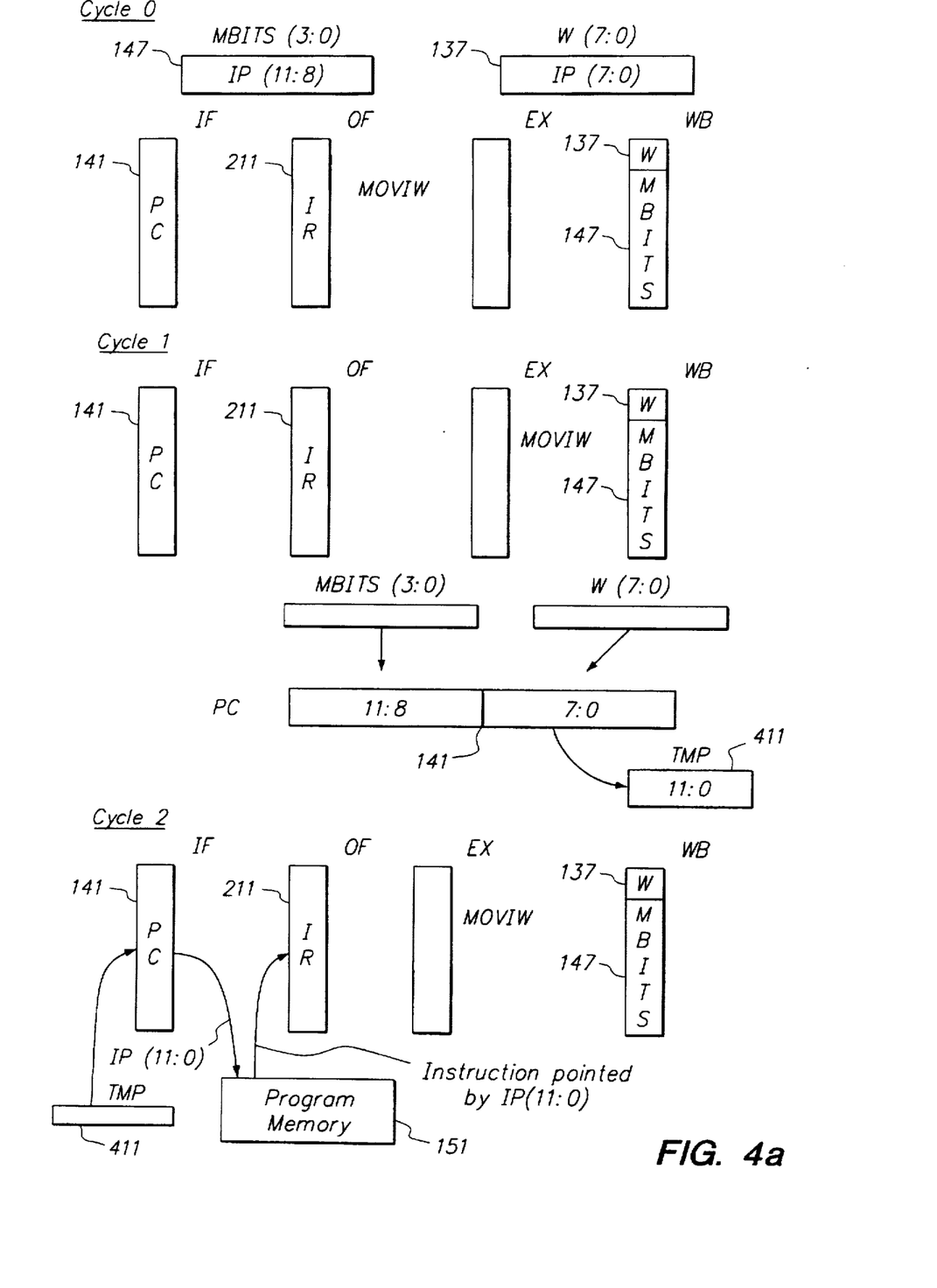
FIGS. 4a and 4b are sequence diagrams illustrating address and data flow when a "move instruction word" instruction is executed in accordance with the present invention.
Figure 4B:
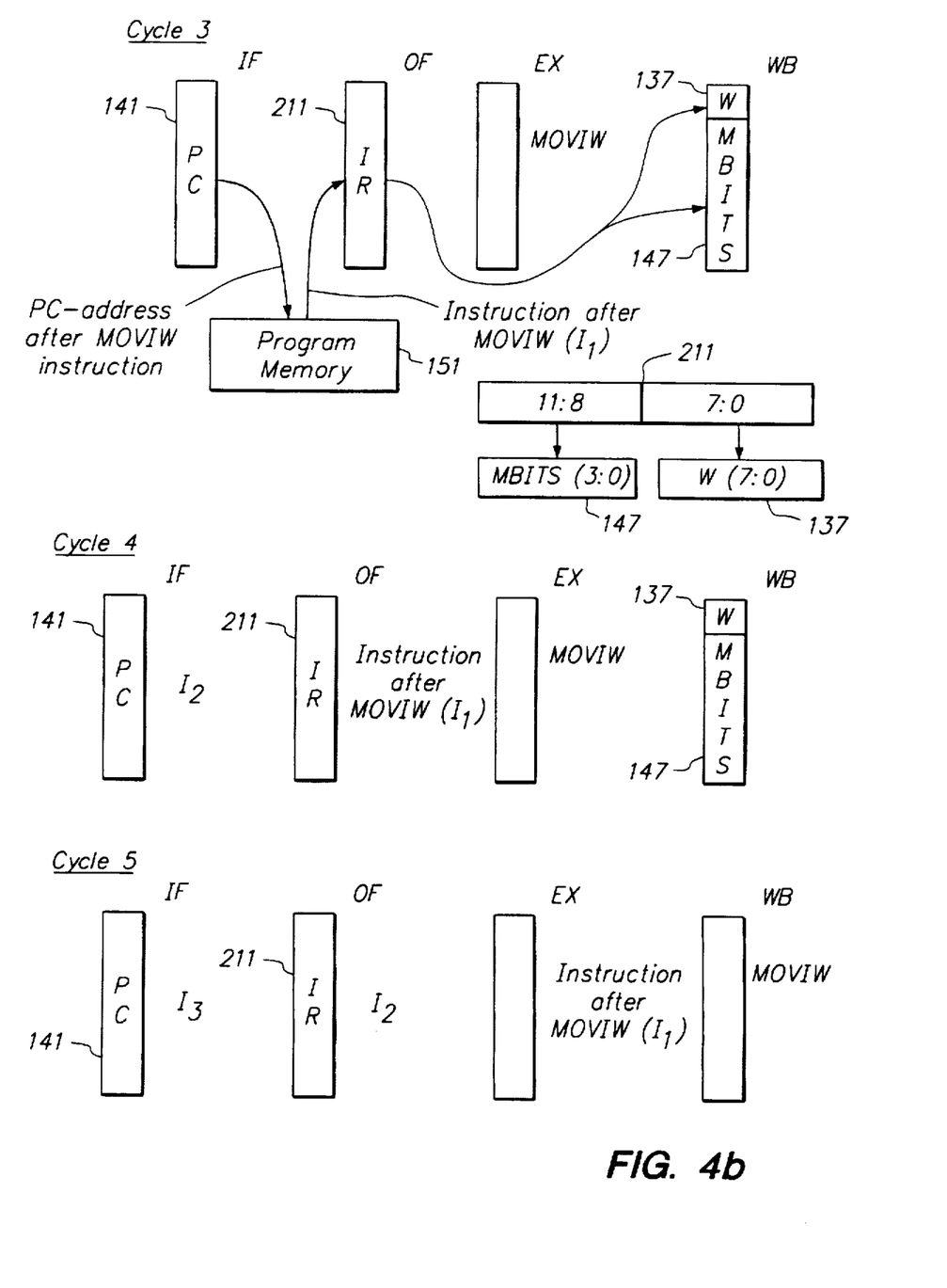

FIGS. 3 and 4a and 4b will be used to describe a process for allowing a data contents of the program memory 151 to be accessible for external sources, for example, a datachecking or fault-detection mechanism or process. FIG. 3 is a flow diagram of a process for performing a data check or fault detection on program instruction data from the program memory 151 in accordance with the present invention. FIGS. 4a and 4b are sequence diagrams illustrating address and data flow when the MOVIW instruction is executed in accordance with the present invention.

The process begins when the microcontroller 101 is reset 305. Although the ensuing process is described with respect to a reset 305, it should be understood that the process may be initiated in other ways, for example, the interrupt timer block 115 times out or the microcontroller 101 is requested to verify the program instruction data from the program memory 151.

After reset 305, data in the word register 137 is stored 307 to a first temporary register and the data in the mode register 147 are stored 307 to a second temporary register. Once the data is stored 307 to the temporary registers, both the word register 137 and the mode register 147 are initialized 309 to zero. It is also noted that if the microcontroller 101 has been operational, the contents of the program register 141 may include an address of an instruction that is or is about to execute.

The process determines 311 whether the combined contents of the word register 137 and the mode register 147 are less than two kilowords. If the contents of the word register 137 and the mode register 147 are less than two kilowords the process initiates 313 the MOVIW instruction. Initially, the MOVIW instruction is fetched from the location it is stored, for example the program memory 151.

After an initial set-up, the MOVIW instruction executes in four clock cycle. Initially, the MOVIW instruction is fetched by the instruction fetch stage 135a of the central processing unit 135. At a zero cycle (cycle 0), the fetched MOVIW instruction is prepared for execution at the operand fetch stage 135b of central processing unit 135. An address of program instruction data that is to be read from the program memory 151 is stored in two separate registers. Specifically, the address is an 11-bit address where a first eight bits (bits 7:0) of the program instruction data address are stored in the word register 137 and a second three bits (bits 10:8) of the program instruction data address are stored in the mode register 147.

At a first clock cycle (cycle 1) the execution stage 135c begins execution of the MOVIW instruction. Once the MOVIW instruction begins execution, the contents of the program counter register 141, i.e., an address of an instruction, I1, that is to process after the MOVIW instruction, are moved to another (e.g., a third) temporary register 411 in the central processing unit 135. Simultaneously, the central processing unit 135 loads into the program counter register 141 the address of program instruction data that is to be accessed within the program memory 151.

At a second cycle (cycle 2), the program instruction data is pointed to or addressed by the address in the program counter register 141. The program instruction data word or content, is read into the instruction register 211. Simultaneously, the contents of the third temporary register 411, which was the address of the instruction prior to execution of the MOVIW instruction, are read back into the program counter register 141.

At a third cycle (cycle 3), the program instruction data in the instruction register 211 is stored into the word register 137 (bits 11:8) and the mode register 147 (bits 7:0). It is noted that although the program instruction data was addressed with the 11-bit address, the data itself is 12-bits. Simultaneously, contents of the program counter register 141 are used to address of an instruction from the program memory 151 and read to the instruction register 211. That is, the address in the program counter register 141 points to the next instruction, I1, to execute after the MOVIW instruction. This instruction, I1, will be read and executed by the central processing unit 135 once the MOVIW instruction completes execution.

At a fourth cycle (cycle 4), the instruction after the MOVIW instruction executes, is at the operand fetch stage 135b, where it gathers the necessary memory operands for the execution stage 135c. Simultaneously, the execution stage 135c of the central processing unit 135 completes execution of the MOVIW instruction. In the write back stage 135d of the central processing unit 135, the program instruction data contents of the word register 137 and the mode register 147 are made available to the data memory 149. In a fifth cycle, the execution stage 135c executes the instruction after the MOVIW instruction.

The system and process of the present invention advantageously makes available the program instruction data from the program memory 151 for a data-checking system and/or process for testing data integrity and validity to detect and prevent program memory 151 faults. The data check continues with a data checking or fault detection system and/or process performing 315 some form of check or test of the data, for example, a cyclic redundancy code ("CRC") check or a parity check. It is noted that the CRC check or the parity check may be performed using a conventional CRC check or parity check system and process.

The process determines 317 whether to complete at this stage or continue to check the remaining program instruction data in the program memory 151. If the process continues, the address that was stored to the word register 137 and the mode register 147 is incremented 319 to the next address and the MOVIW instruction is executed again as described above. If the process determines 211 that there are no more addresses to check so that the contents of the word register 137 and the mode register 147 is less than two kilowords, or if after the data check the process determines 317 not to continue, the process completes. Once the process completes, original contents of the word register 137 and the mode register 147 are restored 321 from the first and the second temporary registers.

By using the data checking or fault detection system and/or process, including the MOVIW instruction, the present invention advantageously allows a small program to be executed to test the instruction code of the program memory 151 of a microcontroller 101 for integrity and validity. For example, the small program may be executed right after reset of the microcontroller 101 to do a CRC check to evaluate the condition of the program memory 151. That is, the claimed invention beneficially allows data from the program memory 151 to be accessible for verifying integrity and validity by providing the data to data memory 149 so that the data may be evaluated using programs or algorithms that evaluate such conditions. Thus, the present invention beneficially provides a system and method for allowing a microcontroller to be compliant with Underwriter Laboratory Specifications for fault detection of a microcontroller's own program memory.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for providing program instruction data from a program memory to a data memory for access for data-checking, the method comprising:

fetching a move instruction;

placing an address of the program instruction in a word register and a mode register;

executing the move instruction;

moving the address of the program instruction from the word register and the mode register to a program counter register;

addressing the program instruction in the program memory using the address in the program counter;

reading the program instruction data from the program memory to an instruction register;

placing the program instruction data from the instruction register to the word register and the mode register; and writing the program instruction data from the word register and the mode register to the data memory.

2. The method for providing the program instruction data from the program memory to the data memory as in claim 1, wherein placing the address of the program instruction data in the word register and the mode register further comprises placing a first eight bits of the address into the word register and a second three bits of the address into the mode register.

3. The method for providing the program instruction data from the program memory to the data memory in claim 1, wherein placing the program instruction data from the instruction register to the word register and the mode register further comprises placing a first eight bits of the program instruction data in the word register and a second eight bits of the program instruction data in the mode register.

4. A microcontroller that provides fault detection for a program memory, the program memory storing program instruction data, the microcontroller comprising:

a processor, coupled to the program memory, the processor including a word register, a mode register, a program counter, and an instruction register; and a data memory, coupled to the processor, for temporarily storing the program instruction data for access by a data checking mechanism;

a move instruction, which, when executed by the processor, causes the processor to provide the program instruction data to the data memory, the processor:

fetching the move instruction;

placing an address of the program instruction data in the word register and the mode register;

executing the move instruction;

moving the address of the program instruction data from the word register and the mode register to the program counter register;

addressing the program instruction data in the program memory with the program counter register address;

reading the program instruction data to the instruction register from the program memory;

placing the program instruction data in the word register and the mode register from the instruction register; and writing the program instruction data to the data memory from the word register and the mode register.

5. The microcontroller in claim 4, wherein the word register is 8-bits wide for storing a first 8-bits of the address of the program instruction and a second 8-bits of the program instruction data.

6. The microcontroller in claim 4, wherein the mode register is 4-bits wide for storing a second 3-bits of the address of the program instruction data and a second 4-bits of the program instruction data.

* * * * *

UNITED STATES PATENT AND TRADEMARK OFFICE
CERTIFICATE OF CORRECTION

PATENT NO.: 5,894,549

DATED: April 13, 1999

INVENTOR: Chuck Cheuk-wing Cheng

It is certified that errors appear in the above-identified patent and that said Letters Patent is hereby corrected as shown below:

Column 11, line 43, replace "the" with --a--.

Column 11, line 50, after "counter" insert --register --.

Column 12, line 22, after "counter" insert --register--.

Column 12, line 31, replace "the" with --a--.

Signed and Sealed this

Twenty-fourth Day of October, 2000

Attest:

Q. TODD DICKINSON

*Attesting Officer*      *Director of Patents and Trademarks*